March 2, 1926.
M. LEACH
1,574,825
SELF FEEDER FOR THRASHING MACHINES
Filed April 16, 1925
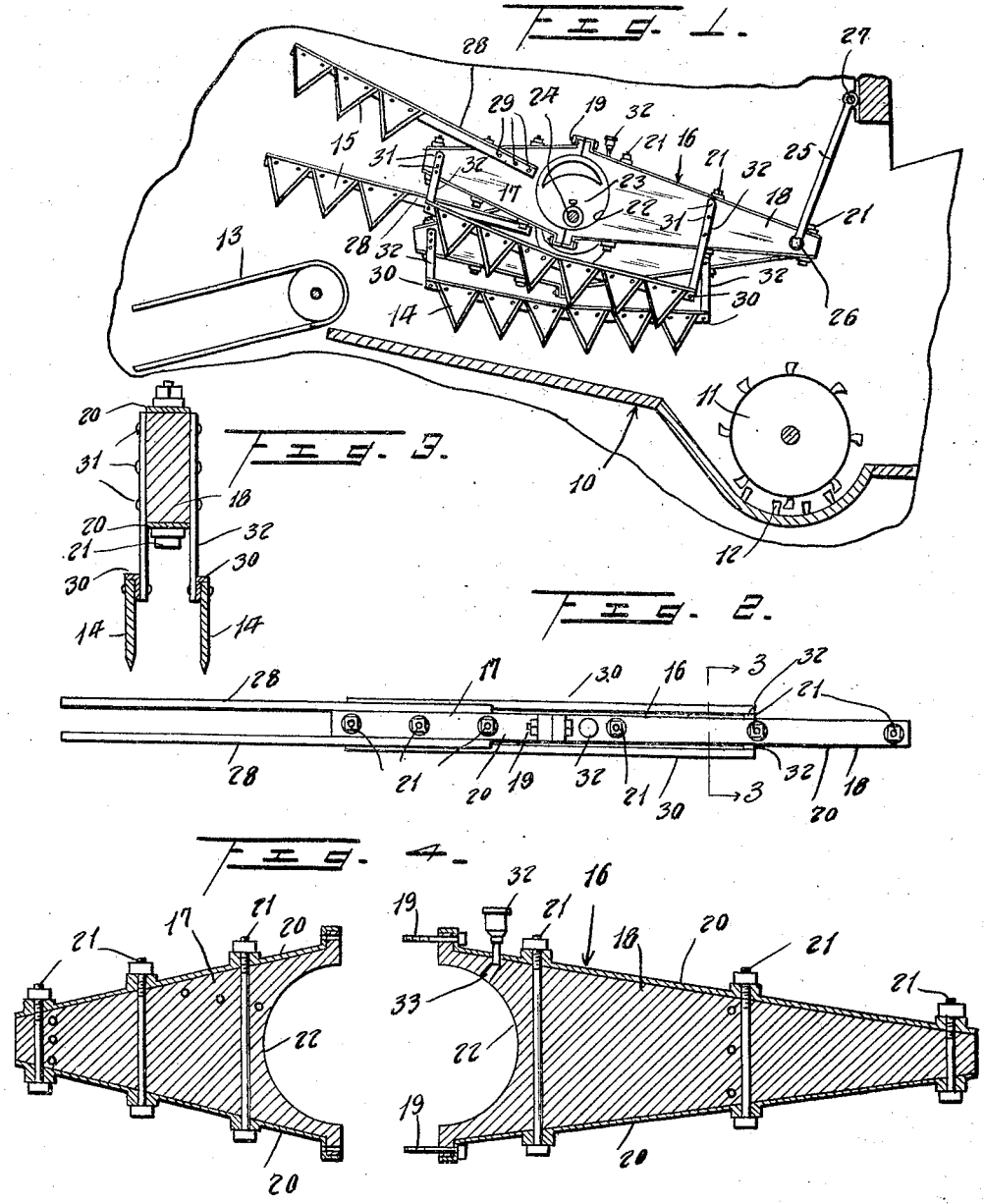
Inventor
M. Leach,
By
Attorney Patented Mar. 2, 1926.

1,574,825

UNITED STATES PATENT OFFICE.

MARTIN LEACH, OF BOZEMAN, MONTANA.

SELF-FEEDER FOR THRASHING MACHINES.

Application filed April 16, 1925. Serial No. 23,661.

*To all whom it may concern:*

Be it known that I, MARTIN LEACH, a citizen of the United States, residing at Bozeman, in the county of Gallatin and State of Montana, have invented certain new and useful Improvements in Self-Feeders for Thrashing Machines; and I do hereby declare the following to be a full, clear, and exact description of the invention, such as will enable others skilled in the art to which it appertains to make and use the same.

This invention relates to a self-feeder for thrashing machines.

It is the general aim of the present invention to provide a construction which will run smoother than existing ones and at the same time with the expenditure of less power, and to provide a construction wherein the parts may be readily disassembled for inspection or repair and wherein the knives are rendered adjustable by the particular construction.

Additional objects and advantages will become apparent from a consideration of the description following taken in connection with accompanying drawings illustrating an operative embodiment.

In said drawings:—

Figure 1 is a view illustrating the improvements applied to a thrashing machine, the latter being shown fragmentarily and in longitudinal section;

Figure 2 is a plan view of one of the knife arms;

Figure 3 is a sectional view taken on the line 3—3 of Figure 2 and

Figure 4 is a central longitudinal sectional view through one of the knife arms, the sections thereof being in separated relation.

Referring specifically to the drawings, parts of a thrashing machine are shown conventionally at 10. The cylinder and concave are suggested at 11 and 12 and the feeder belt is shown at 13. 14 and 15 designates knives, preferably of sickle bar formation as shown, which knives are adapted to cut the bands, split the bundles and feed the grain in from the top.

Arms adapted to carry said knives 14 and 15 and operate them are generally designated 16. These arms are made up of sections 17 and 18 which are adapted to be connected together at adjacent ends in any suitable manner as by means of bolts 19. Along the longitudinal edges, said arms 16 are reenforced by metalic strips as at 20 and the bolts 19 pass therethrough for secure anchorage. In addition reenforcing bolts 21 also pass transversely through the arms 16. Such arms, aside from the metal parts referred to are preferably made of wood and at their facing ends where joined together by the bolts 19 are formed with a round opening 2 in which an eccentric wheel or disk 23 is disposed. The machine of course has a plurality of the arms 16 and cutters 14 and 15 and each arm has an eccentric 23 associated with it and arranged to actuate it at the proper time. All of the eccentrics 23 are rigid with a shaft 24 and shaft 24 is adapted to be driven in any suitable manner from the power means which operates the thrashing machine. The arms 16 have suspending links 25 pivotally connected at the rear to their sections 18 as at 26 and pivotally connected to the frame of the thrasher as at 27. The cutters 15 have attaching bars 28 which are bolted to the section 17 as at 29.

Cutters 14 at each end have attaching shanks 30 which are fastened by bolts 31 to the sections 17 and 18, such shanks having a plurality of slots 32 in which the bolts 31 may be selectively placed in order to vary the position of knives 14 or adjust them according to the material to better adapt them to their work. As shown in Figure 3, the knife 14 is preferably disposed at each side of each arm.

In operation, as the shaft 24 revolves, the eccentrics 23 oscillate and move the arms 16 and accordingly the cutters 15 and 14, so that the latter will cut the bands, split and feed the grain in from off the top. The adjustment of the cutters 14 greatly facilitates the attainment of this end.

The periphery of each eccentric disk 23 may be lubricated in any suitable manner as from an oil cup or lubricator 32 carried by section 18 and arranged in communication with a groove 33 leading to said periphery.

Changes may be resorted to provided they fall within the spirit and scope of the invention.

I claim as my invention:—

1. A thrashing machine having a feeder knife, an arm comprising sections carrying said knife, said sections being relatively wide at and abutting each other at adjacent ends, on a line transverse to the longitudinal axis of the arm, said ends being cut away to form an annular opening, and a drive eccentric for the arm occupying said opening.

2. A thrashing machine having a feeder knife, an arm comprising sections carrying said knife, said sections being relatively wide at and abutting each other at adjacent ends, on a line transverse to the longitudinal axis of the arm, said ends being cut away to form an annular opening, a drive eccentric for the arm occupying said opening, said sections being primarily of wood, metallic strips lining the longitudinal edges of the sections, and fastening elements for the sections passing through said metallic elements for anchorage.

In testimony whereof I affix my signature.

MARTIN LEACH.